United States Patent
Joubert

[15] 3,694,739
[45] Sept. 26, 1972

[54] TESTING CIRCUIT FOR A SOLAR BATTERY INCLUDING A VOLTAGE SOURCE CONTROLLED BY THE BATTERY'S TERMINAL VOLTAGE

[72] Inventor: Alain Francois Joubert, Paris, France

[73] Assignee: Societe Anonyme de Telecommunications, Paris, France

[22] Filed: Jan. 30, 1970

[21] Appl. No.: 7,284

[52] U.S. Cl. ................................................324/29.5
[51] Int. Cl....H01m 31/04, G01n 27/00, G01r 31/00
[58] Field of Search ......................324/29.5; 340/249

[56] References Cited

UNITED STATES PATENTS 3,532,968  10/1970  Overlie......................324/29.5

Primary Examiner—Gerhard R. Strecker
Attorney—Seidel, Gonda & Goldhammer

[57] ABSTRACT

The invention concerns a circuit for spot measuring the distinctive voltage-current characteristic of a solar battery subjected to a given degree of illumination, in which the charge circuit of the solar battery being tested comprises, in series, a fixed resistance whose terminal voltage is a measure of the strength delivered by the solar battery, and a voltage source whose instantaneous value depends on that of the battery's terminal voltage and whose variations in value around a central value are opposite to and much greater than the terminal voltage variations of the solar battery around a predetermined value in conformity with the testing conditions.

4 Claims, 5 Drawing Figures

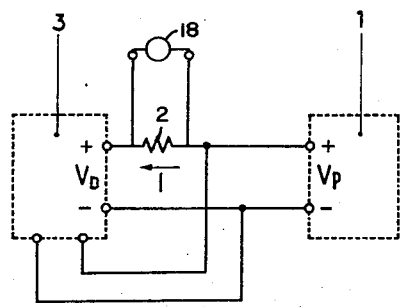
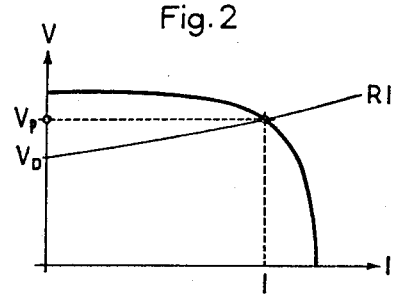
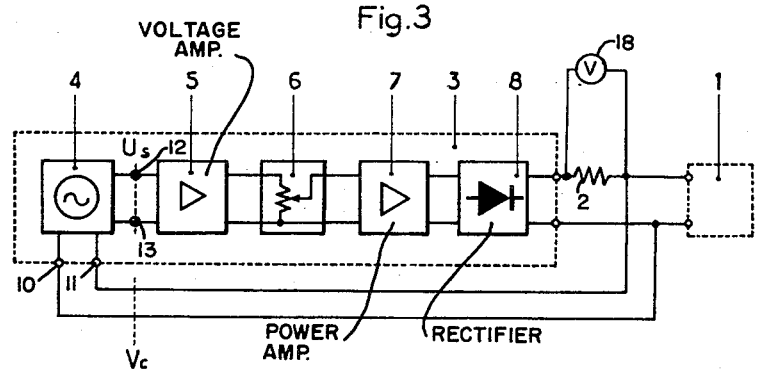
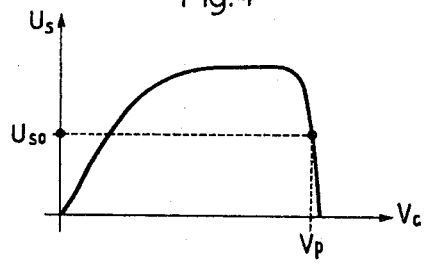

TESTING CIRCUIT FOR A SOLAR BATTERY INCLUDING A VOLTAGE SOURCE CONTROLLED BY THE BATTERY'S TERMINAL VOLTAGE

This invention concerns a circuit for spot measuring the distinctive voltage-current characteristic of a solar battery subjected to a given degree of illumination.

The method of ascertaining such a distinctive characteristic by referring to the so-called upstream or downstream circuits and varying the charge resistance of the solar battery is well-known. Unfortunately, these circuits are difficult to apply in this instance, as the solar battery is a non-linear dipole which is in addition sensitive to chance instantaneous variations in illumination, such as an electric xenon arc generally produces. Moreover, the qualifying of solar batteries in a fabrication series, normally obtained by reading the current delivered by a given voltage measured at the battery terminals, necessitates retouches to the feed resistance for each battery examined in the series.

The object of the invention is a circuit for measuring the intensity of the current delivered by a solar battery for a given terminal voltage, particularly adapted for measuring in a fabrication series.

For this purpose, the circuit in accordance with the invention is of the opposition type, characterized by the fact that the charge circuit of the battery being tested comprises, in series, a fixed resistance whose terminal voltage is a measure of the strength delivered by the solar battery, and a voltage source whose instantaneous value depends on that of the battery's terminal voltage and whose variations in value around a central value are opposite to and much greater than the terminal voltage variations of the solar battery around a predetermined value in conformity with the testing conditions.

The said voltage source is characterized by the fact that it comprises the association of an alternating current generator whose amplitude varies under the command of the solar battery's terminal voltage around a working value selected within the abrupt descending part of the control voltage-current characteristic, a voltage amplifier, a power amplifier with adjustable output response, and a rectifying circuit whose terminals are those of the voltage source.

In a preferred method, the voltage source is transistorized. It comprises, as an alternating current generator, a COLLPITTS type oscillator with an emitter follower transistor configuration comprising in its base-collector circuit the terminal voltage of the solar battery, a R-C network, a potentiometer for adjusting the functioning point and the output resistance of the oscillator. It also comprises an adjustable potentiometer connected to the voltage amplifier.

Other characteristics of the circuit in accordance with the invention will become evident from the following description, the understanding of which will be facilitated by reference to the attached drawings.

FIG. 1 represents the circuit principle used in the invention.

FIG. 2 represents a typical voltage-current characteristic of a solar battery.

FIG. 3 represents, in the form of a block diagram, the plan of the voltage source placed in series within the solar battery charge circuit.

FIG. 4 represents the effective generator output voltage characteristic as a function of the control voltage applied to it.

Figure 5:
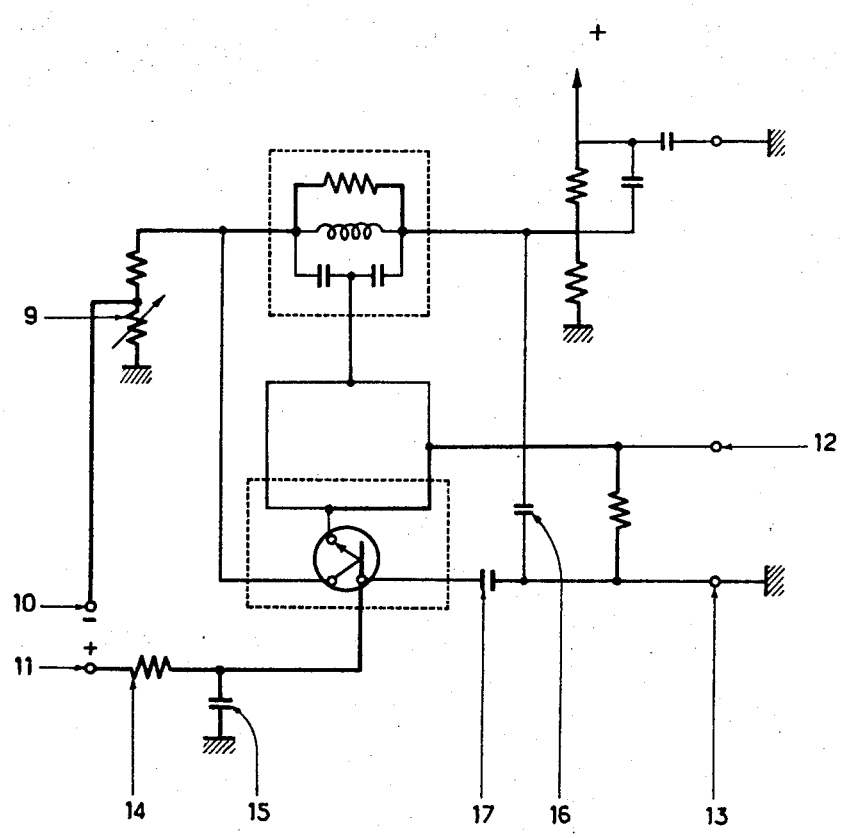
FIG. 5 shows a schematic diagram of a preferred circuit for the alternating current generator.

Referring now to the drawings in detail wherein like numerals indicate like elements, there is shown in FIG. 1, which represents the circuit principle used in the invention, the solar battery 1 feeds a circuit made up of the resistance 2, having the value $R$, traversed by the current I delivered by the battery 1, and of the voltage source 3. In addition, the voltage $V_p$ at the terminals of the battery 1 controls the value of the voltage $V_D$ at the terminals of the source 3. Voltmeter 18, connected across resistance 2, gives a measure of the flow of current produced by solar battery 1 which, on the other hand, furnishes a substantially constant voltage $V_p$.

FIG. 2 represents a typical voltage-current characteristic of a solar battery, such as 1. By appropriate adjustment of the elements contained in the source 3, the value of $V_D$ is influenced so that the voltage $V_p$ is recorded at the terminals of the battery 1 being measured.

Therefore there is the relation:

$$V_p = V_D + RI$$

whence the differential relation:

$$dV_p = dV_D + RdI$$

Control of voltage $V_D$ by voltage $V_p$ is characterized by the relation:

$$dV_D = -G dV_p$$

where the gain G of the source 3 is very large with respect to one. Consequently:

$$(1+G) dV_p = RdI$$

reduces to $$dV_p \sim \frac{R}{G} dI$$

It will be noted that whatever the causes of change in the current $I$ — variations in illumination on one and the same battery, changing the battery being tested — the voltage $V_p$ varies very little. As a result, tests on a series are very quick, on the one hand because the readings of $V_p$ are very stable and, on the other hand because manual adjustment is no longer necessary during the measurements. In addition, the initial adjustment can be effected on any battery in the series, provided that the latter is in good working order.

To arrive at this result, the source 3 comprises, as shown in FIG. 3, an alternating current generator 4 of a frequency of several tens of kilo-Hertz, a voltage amplifier 5, a gain-control potentiometer 6, a power amplifier 7, and a full wave rectifier 8 followed by a filter.

FIG. 4 represents the curve of the effective value $U_s$ of the alternating current outflow from the generator 4, as a function of the control voltage $V_c$, which is that of the terminal voltage of the battery 1. The generator 4 should present such a characteristic whose average working point corresponds to $U_{so}$ for the voltage value $V_p$ desired.

FIG. 5 represents the diagram principle of a preferred embodiment of the alternating current generator connected between the terminals 12 and 13. In this diagram, the 3-pole feedback and the amplifier, which are well-known, are illustrated. The amplifier is in this instance reduced to a common transistor amplifier. The average functioning point depends on the sizing of the circuit elements. This circuit comprises in particular an adjustment potentiometer 9, the terminals 10 and 11 where the terminal voltage of the battery 1 is applied, and a R-C filtering network 14 and 15 eliminating the effect of chance variations in the voltage applied between terminals 10 and 11. The condensers 16 and 17 are high value transistor base by-pass capacitors.

The circuit element shown in heavy lines in FIG. 5 may be selected to place the operating point of the alternating current generator or oscillator at the point $U_{SO}$, $V_P$ on the output characteristic curve of the oscillator as shown in FIG. 4. That is, the oscillator is biased to operate in the rapidly decreasing portion of its characteristic output curve rather than on the flat upper portion of the curve where a stable oscillator would normally be biased to operate. Therefore, as may be seen from FIG. 4, the output of the oscillator provides variations in magnitude opposite to and greater in magnitude than variations in the voltage at the input terminals 10 and 11 of the oscillator.

The circuit in accordance with the invention presents a working shift of less than 0.5 V per hour, easily corrected by means of the potentiometer 6 shown in FIG. 3. Consequently, through measurement of the voltage appearing at the terminals of resistance 2, a value proportional to the current supplied by the battery is obtained. Since the terminal voltage is constant at the battery's terminals, this configuration allows the determination of a characteristic point of voltage-current for the solar battery being tested.

In another connection, differences of less than 0.5 per cent have been noted between the terminal voltages of two solar batteries whose output currents differed by 25 percent. In practice, in a fabrication series, two extreme batteries do not present a difference in output of more than 10 per cent.

What is claimed is:

1. A circuit for spot measuring a current-voltage characteristic of a solar cell subjected to a predetermined illumination, comprising: a resistance having a first terminal and a second terminal; a controlled voltage source having an input and an output, said controlled voltage source producing a voltage at said output of said controlled voltage source varying in magnitude in response to a voltage at said input of said controlled voltage source, said variations in magnitude being opposite to and greater in magnitude than variations about a predetermined operating value in the voltage at said input terminals of said controlled voltage source, said resistance being connected between said output of said controlled voltage source and a terminal of the solar battery being measured; means for applying the voltage at the terminals of the solar battery being measured to said input terminals of said controlled voltage source; and means for measuring the voltage across said first and second terminals of said resistance.

2. A circuit as recited in claim 1 wherein said controlled voltage source includes an alternating voltage generator, the amplitude of the output of said alternating voltage generator varying in response to the voltage at said input of said controlled voltage source, said alternating voltage generator being operated around an operating value selected in the abrupt descent portion of its control voltage-amplitude characteristic.

3. A circuit as recited in claim 2 wherein said controlled voltage source includes means for amplifying the output of said alternating voltage generator and means for rectifying the amplified output of said alternating voltage generator.

4. A circuit as recited in claim 3 wherein said amplifying means is provided with means for adjusting the gain of said amplifying means.

* * * * *

UNITED STATES PATENT OFFICE
CERTIFICATE OF CORRECTION

Patent No. 3,694,739  Dated September 26, 1972

Inventor(s) Alain Francois Joubert

It is certified that error appears in the above-identified patent and that said Letters Patent are hereby corrected as shown below:

In the heading above the Abstract of the Disclosure, insert --Claims foreign priority of June 17, 1969 based upon application Serial No. 69 20 042 filed in France on June 17, 1969.--

Signed and sealed this 13th day of March 1973.

(SEAL)
Attest:

EDWARD M. FLETCHER, JR.
Attesting Officer

ROBERT GOTTSCHALK
Commissioner of Patents